United States Patent
Wang

(10) Patent No.: US 7,672,291 B2
(45) Date of Patent: Mar. 2, 2010

(54) METHODS FOR ESTABLISHING WIRELESS NETWORK COMMUNICATION AND DEVICE UTILIZING SAME

(75) Inventor: John C. Wang, Taoyuan (TW)

(73) Assignee: HTC Corporation, Taoyuan, Taoyuan County (TW)

(*) Notice: Subject to any disclaimer, the term of this patent is extended or adjusted under 35 U.S.C. 154(b) by 681 days.

(21) Appl. No.: 11/058,631

(22) Filed: Feb. 16, 2005

(65) Prior Publication Data

US 2006/0013187 A1    Jan. 19, 2006

(30) Foreign Application Priority Data

Jun. 23, 2004    (TW)    .............................. 93118046 A

(51) Int. Cl.
    H04J 3/06      (2006.01)

(52) U.S. Cl. ........................ 370/350; 370/347; 370/337; 370/338; 455/502; 455/41.2; 455/509; 455/517; 455/67.11

(58) Field of Classification Search ......... 370/345–350, 370/337, 321, 442, 331, 338, 335; 455/426.1, 455/466, 41.1–41.2, 517–519, 423–425, 455/502, 509, 67.11

See application file for complete search history.

(56) References Cited

U.S. PATENT DOCUMENTS

| | | | | |
|---|---|---|---|---|
| 3,879,580 | A * | 4/1975 | Schlosser et al. ............ | 370/324 |
| 4,574,379 | A * | 3/1986 | Eng et al. .................... | 370/324 |
| 5,195,091 | A * | 3/1993 | Farwell et al. ............... | 370/336 |
| 5,267,261 | A * | 11/1993 | Blakeney et al. ............ | 370/332 |
| 5,428,603 | A * | 6/1995 | Kivett ........................ | 370/280 |
| 5,473,605 | A * | 12/1995 | Grube et al. ................ | 370/261 |
| 5,511,232 | A * | 4/1996 | O'Dea et al. ................ | 455/519 |
| 5,515,366 | A * | 5/1996 | Chieu et al. ................. | 370/347 |
| 5,802,044 | A * | 9/1998 | Baum et al. ................. | 370/330 |
| 5,822,314 | A * | 10/1998 | Chater-Lea ................. | 370/337 |
| 6,028,849 | A * | 2/2000 | Niot et al. ................... | 370/280 |

(Continued)

FOREIGN PATENT DOCUMENTS

EP      1 276 337 A1     1/2003

(Continued)

OTHER PUBLICATIONS

XP-002214950, "Specification of the Bluetooth System", vol. 1, Dec. 1, 1999.

*Primary Examiner*—Sharad Rampuria
(74) *Attorney, Agent, or Firm*—Birch, Stewart, Kolasch & Birch, LLP

(57) ABSTRACT

Method for establishing wireless networks between devices is disclosed. When a first device is activated to establish a wireless network with other devices, a first activation reference time is recorded. At least one second device that has at least one compatible networking capability is searched for and identified. When the second device is activated to establish wireless network with other devices, a second activation reference time also is recorded. The first and second activation reference times are compared to determine whether they fall into the same time window. The offset between the system time of the first device and that of the second may be factored into the calculation to further enhance the accuracy. If the first and second activation reference times are in the same time window, the authentication of wireless network is established between the devices.

26 Claims, 4 Drawing Sheets

U.S. PATENT DOCUMENTS

| | | | |
|---|---|---|---|
| 6,134,231 A * | 10/2000 | Wright | 370/348 |
| 6,477,162 B1 * | 11/2002 | Bayley et al. | 370/342 |
| 6,480,957 B1 | 11/2002 | Liao et al. | |
| 6,526,029 B1 * | 2/2003 | Zhong | 370/335 |
| 6,571,103 B1 * | 5/2003 | Novakov | 455/464 |
| 6,816,725 B1 * | 11/2004 | Lemke et al. | 455/414.1 |
| 6,865,371 B2 * | 3/2005 | Salonidis et al. | 455/41.1 |
| 6,961,537 B2 * | 11/2005 | Rajaram | 455/3.01 |
| 7,286,841 B2 * | 10/2007 | Sun et al. | 455/502 |
| 7,349,362 B2 * | 3/2008 | Belcea | 370/321 |
| 7,394,782 B2 * | 7/2008 | Davis | 370/324 |
| 2001/0055949 A1 * | 12/2001 | Law et al. | 455/41 |
| 2002/0049057 A1 * | 4/2002 | Moulsley et al. | 455/436 |
| 2004/0116073 A1 * | 6/2004 | Mauney et al. | 455/41.2 |
| 2004/0121766 A1 * | 6/2004 | Benson et al. | 455/425 |
| 2006/0040656 A1 * | 2/2006 | Kotzin | 455/426.2 |

FOREIGN PATENT DOCUMENTS

| | | |
|---|---|---|
| WO | WO-02/054790 | 7/2002 |

* cited by examiner

METHODS FOR ESTABLISHING WIRELESS NETWORK COMMUNICATION AND DEVICE UTILIZING SAME

CROSS-REFERENCE TO RELATED APPLICATIONS

This application was originally deposited on Mar. 3, 2004, in the United States Patent and Trademark Office under the Disclosure Document Deposit Program and was assigned Disclosure Document No. 548,173.

The present application claims priority of Taiwanese application, Method for wireless network establishment between devices and apparatus thereof, application number 93118046, filed on Jun. 23, 2004.

BACKGROUND OF THE INVENTION

1. Field of the Invention

The present disclosure relates generally to establishing wireless network communication, and, more particularly, to methods for automatically and accurately establishing wireless network communication between devices.

2. Brief Discussion of the Related Art

Wireless network technology has become pervasive in a wide variety of devices, such as notebook computers, cellular phones, smart phones and PDAs. Built-in networking capabilities can be used to establish connection and execute related wireless operations between devices. For example, devices can exchange contact information, such as digital business cards, wirelessly.

IR communication is a conventional method for transferring digital information between devices. When IR communication is used between two or more devices, the number of transactions grows geometrically as the number of devices involved increases. The relationship between the number of IR transactions and the number of devices involved is summarized as follow:

$n = m \times (m-1)n$, in which n is the number of IR transactions, and m is the number of devices involved. This geometric growth is illustrated in table 1.

TABLE 1

| Number of devices | Number of IR transactions |
|---|---|
| 2 | 2 |
| 3 | 6 |
| 4 | 12 |
| 5 | 20 |
| 6 | 30 |
| 8 | 56 |
| 12 | 132 |
| 20 | 380 |

FIG. 1 is a schematic diagram illustrating data flows based on conventional IR communication. As shown in FIG. 1, if five devices (1, 2, 3, 4, and 5) exchange data, the number of data transactions that must be initiated grows to 20 transactions. IR communication becomes impractical as the number of involved devices grows.

Radio Frequency (RF) technologies, such as Bluetooth, allow multiple devices to communicate without requiring line-of-sight alignment. For this reason, problems associated with IR communication can be substantially eliminated. RF technologies, however, have other problems. Misdetection of devices belonging to different exchange groups may occur, if the challenge friends-or-foes identification is not addressed.

Additionally, complex and time-consuming operational steps are typically required. First, a RF networking capability of a device is manually turned on. Then, available network devices are explored, and the correct devices among all visible devices on the network are selected for connection. Finally, wireless data exchange is performed, and, as the last step, the RF networking capability is turned off when the wireless data exchange is completed. The learning curve to perform the aforementioned operations may seem insurmountable to many users. As a result, using conventional RF technologies to exchange data is still not widely practiced.

SUMMARY OF THE INVENTION

Methods for establishing wireless network communication between devices and devices using the same are provided. In some embodiments, an activation signal is generated when a first device is activated to establish wireless network with other devices. A wireless connection module providing at least one wireless network capability is then checked in response to the activation signal, and the wireless connection module is then turned on if it is off. Thereafter, at least one second device on a network corresponding to the wireless network capability is searched for and identified, and a wireless network is automatically established between the first and second devices.

At least one wireless operation is further performed after the wireless network is established. The wireless operation exchanges data between the first and second devices. When the wireless operation is completed, the wireless connection between the first and second devices is terminated, and the wireless connection module is returned to the original state.

In some embodiments, a first activation reference time is recorded when a first device is activated to establish a wireless network with other devices. At least one second device on a network corresponding to at least one compatible networking capability is then searched for and identified. When the second device is activated to establish a wireless network with other devices, a second activation reference time is also recorded. The first and second activation reference times are compared to determine whether they fall into the same time window. If the first and second activation reference times are in the same time window, the authentication is automatically established between the first and second devices.

The offset between the system time of the first device and that of the second may be factored into the calculation to further enhance accuracy when comparing activation reference times.

At least one wireless data exchange operation is further performed after authentication is established. When the wireless data exchange operation is completed, the wireless connection between the first and second devices is terminated.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

When two or more users activate to establish wireless network with others, they may push the designated "Establishment" keys on their devices at substantially the same time. Over the next immediate few moments, all involved devices automatically activate (turn on) their wireless network feature (if not already on), explore for the presence of the surrounding devices, establish wireless connections with other devices, make friend-or-foes determination, optionally perform wireless data transactions, such as coordinating among themselves on data exchange sequence, and exchanging data with each other, and finally turn off the wireless network feature (if originally off to begin with).

Figure 1:
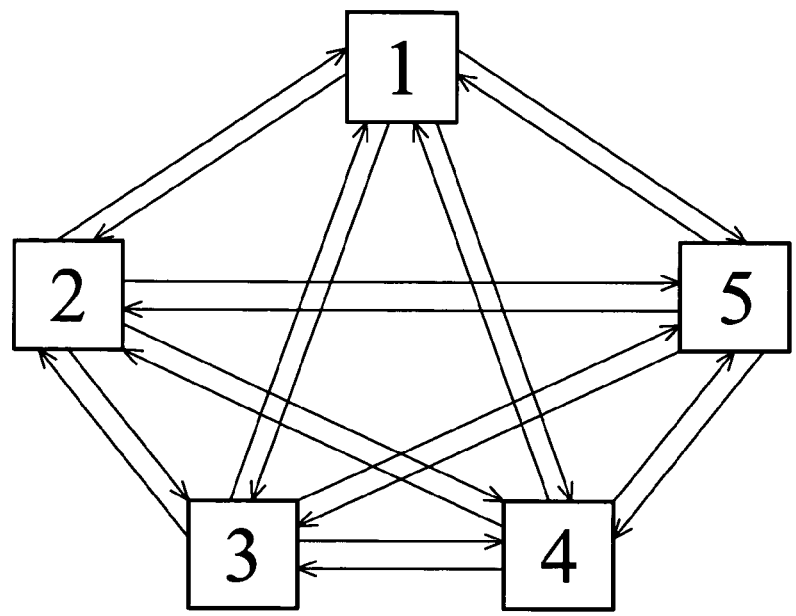
FIG. 1 is a schematic diagram illustrating data flows based on conventional IR communication.
Figure 2:
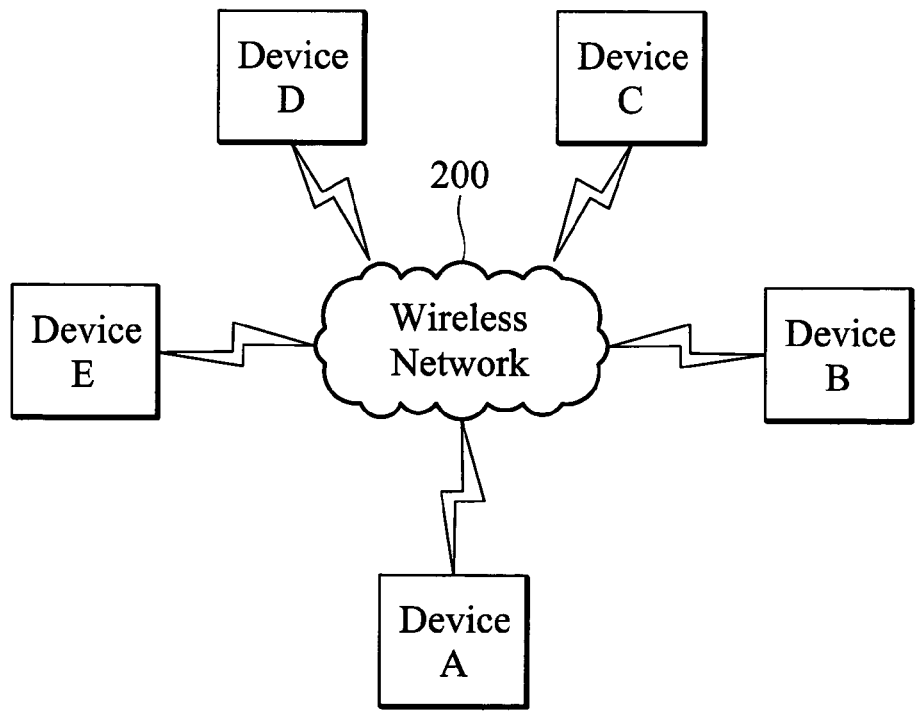
FIG. 2 is a schematic diagram illustrating an embodiment of a wireless network.

FIG. 2 is a schematic diagram illustrating an embodiment of a wireless network. Designated keys on respective devices (A, B, C, D, and E) can be pushed simultaneously to establish a wireless network therebetween. A wireless network 200 between the devices is then automatically established, and wireless operations can then be performed via the wireless network 200. Examples of wireless operations include business card exchange, geographical coordinate data swapping, data synchronization, process negotiation, scheduling, and others.

Figure 3:
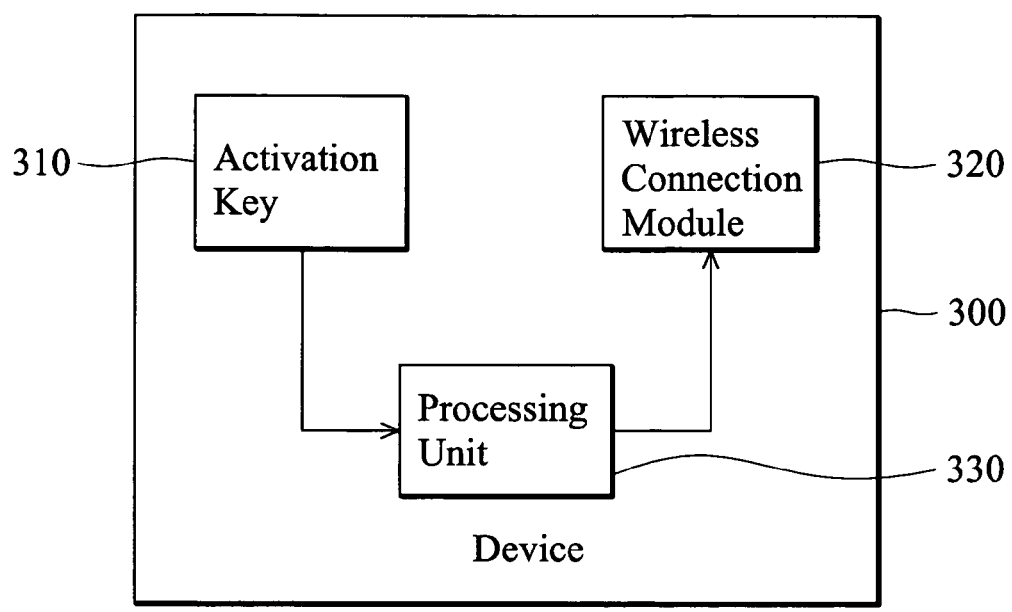
FIG. 3 is a schematic diagram illustrating an embodiment of a device.
Figure 4:
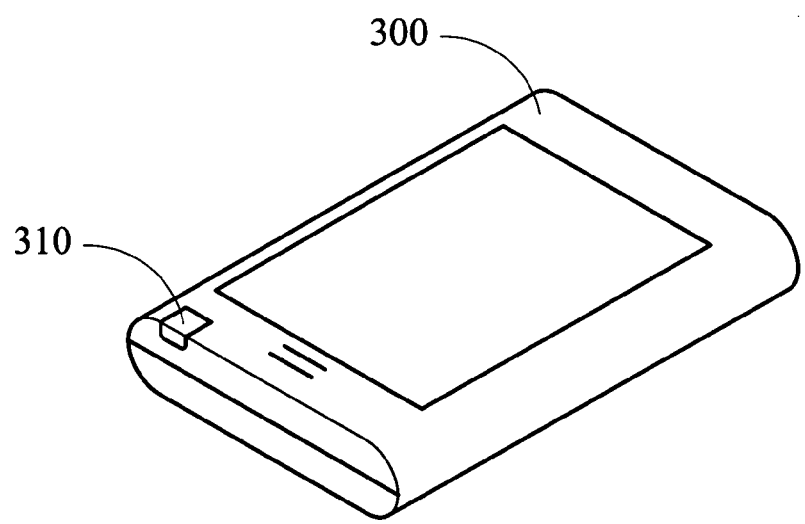
FIG. 4 shows the outward appearance of an embodiment of a device.

FIG. 3 is a schematic diagram illustrating an embodiment of a device utilizing a method of establishing wireless network communication. An embodiment of the device 300 comprises at least an activation key 310, at least one wireless connection module 320, and a processing unit 330. The device 300 may be a notebook, or a handheld device, such as a cellular phone, smart phone, PDA, and others. The activation key 310 is pressed to establish wireless network communication. The outward appearance of an embodiment of the device 300 and activation key 310 are shown in FIG. 4. It is understood that the activation key 310 may be an additional key or original function key on the device 300. The wireless connection module 320 may provide optical networking capabilities, such as infrared or laser, or RF networking capabilities, such as Bluetooth or WiFi. The processing unit 330 performs related operations of the device 300 and methods for establishing wireless network communication.

Figure 5:
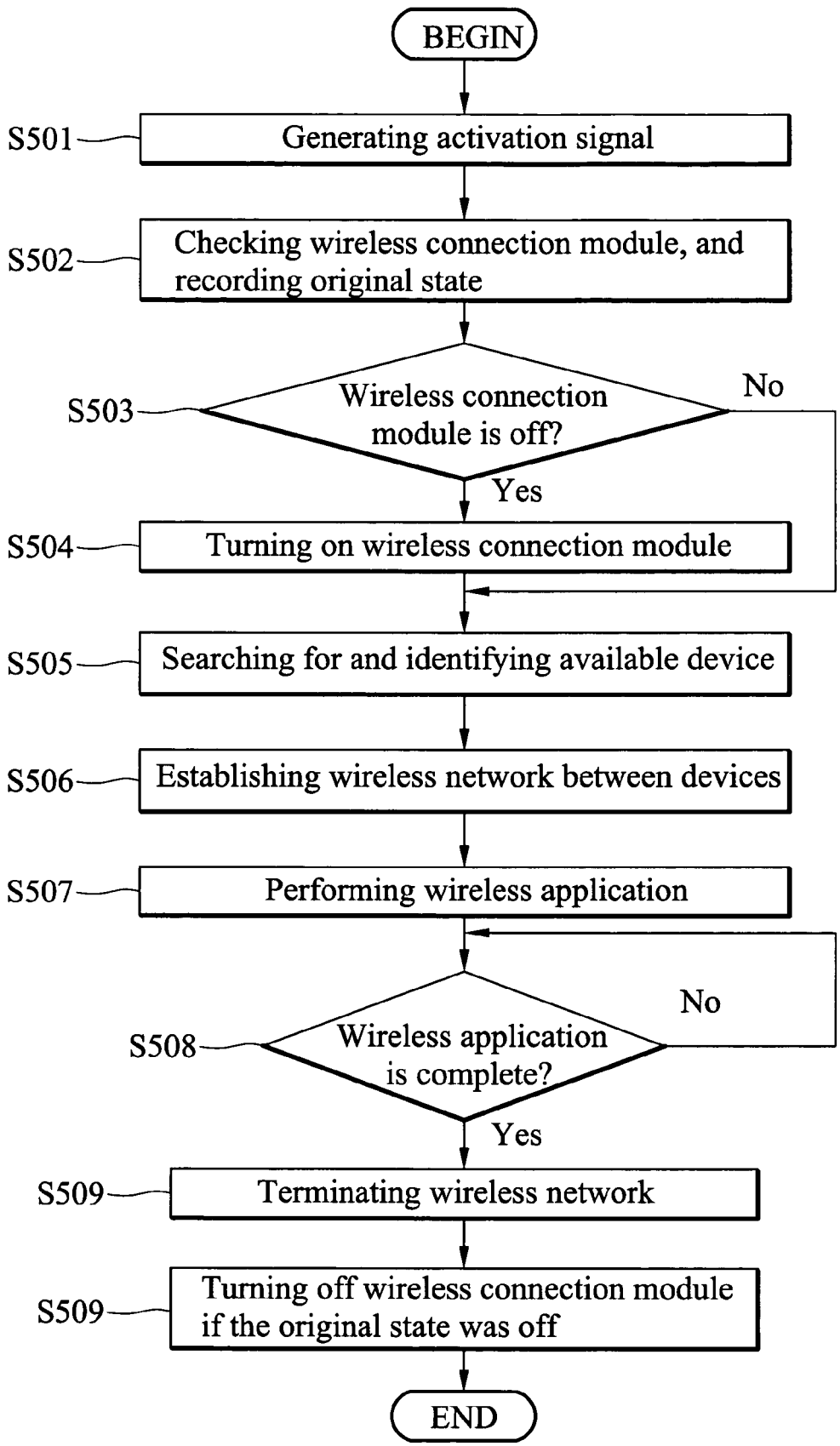
FIG. 5 is a flowchart showing an embodiment of a method for establishing wireless network communication between devices.

FIG. 5 is a flowchart showing an embodiment of a method for establishing wireless network communication between devices.

In step S501, an activation signal is generated via the activation key 310 when the device 300 is activated to establish a wireless network with other devices. In step S502, the power status of the wireless connection module 320 providing at least one wireless network capability is checked and verified in response to the activation signal. The original on/off state of the wireless connection module 320 is recorded, such that the power status of the wireless connection module 320 can be returned to the original state after the entire process is completed. If the wireless connection module 320 is already on (No in step S503), the procedure goes to step S505. If the wireless connection module 320 is off (Yes in step S503), in step S504, the wireless connection module 320 is turned on. It is understood that the device 300 may include several wireless connection modules 320, and the processing unit 330 can check that all of the wireless connection modules 320, record their respective states, turning on the respective wireless connection modules 320 if they are off.

In step S505, at least one available device on a network corresponding to the wireless network capability provided by the wireless connection modules 320 is searched for and identified, and in step S506, a wireless network is automatically established between the devices 300 and the located device. Since the device 300 may include several wireless connection modules 320, available devices can be searched for according to a predetermined priority of wireless network capabilities or types provided by the wireless connection modules 320, for example, line-of-sight optical-based networks take precedence over radio-based networks. If the device 300 supports both optical and radio-based networking capabilities, the device 300 first searches for another available device on the optical network and attempts connection therewith.

Then, in step S507, at least one wireless operation, such as data exchange or synchronization is performed between the device 300 and the located device. If the wireless operation is not completed (No in step S508), the procedure remains at step S508 to determine whether the wireless operation is completed. If the wireless operation is completed (Yes in step S508), in step S509, the wireless connection between the device 300 and the located device is terminated. In step S510, the wireless connection module 320 is turned off if the original state was off. It is understood that if the wireless operation of each located device on the network corresponding to the same wireless network capability is completed, the wireless connection modules 320 are returned to their respective original states.

Additionally, an interface can be provided for confirming execution of the wireless operation, and determining the types of the wireless operations requested by the device 300 and the located device. If the types are different, the wireless network is terminated.

Figure 6:
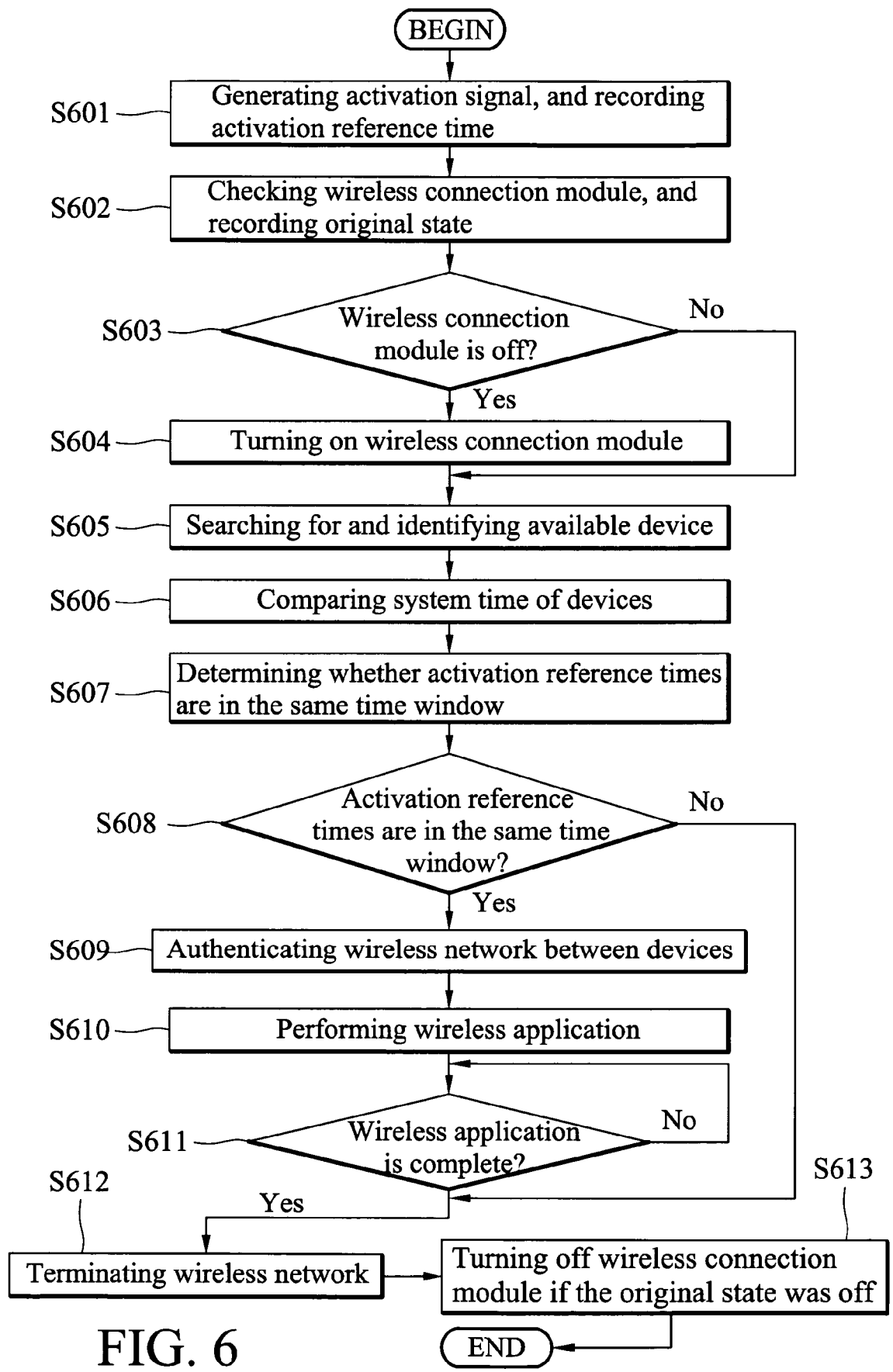
FIG. 6 is a flowchart showing another embodiment of a method for establishing wireless network communication between devices.

FIG. 6 is a flowchart showing another embodiment of a method for establishing wireless network communication between devices. In this embodiment, a friend-or-foe determination is further performed, such that the authentication of wireless network can be automatically and accurately established between devices.

First, in step S601, when the device 300 is activated to establish a wireless network with other devices, an activation signal is generated via the activation key 310, and an activation reference time is recorded. Then, in step S602, the power status of the wireless connection module 320 providing at least one wireless network capability is checked in response to the activation signal. The original on/off state of the wireless connection module 320 is recorded, such that the power status of the wireless connection module 320 can be returned to the original state after the process is completed. If the wireless connection module 320 is already on (No in step S603), the procedure goes to step S605. If the wireless connection module 320 is off (Yes in step S603), in step S604, the wireless connection module 320 is turned on. Similarly, the device 300 may include several wireless connection modules 320, and the processing unit 330 can verify and record the respective states of all the wireless connection modules 320, and turn on the wireless connection modules 320 if they are off.

Thereafter, in step S605, at least one available device on a network corresponding to the wireless network capability provided by the wireless connection modules 320 is searched for and identified. Then, in step S606, the offset between the system time of the device 300 and that of the located device is calculated, and in step S607, the activation reference times corresponding to the device 300 and located device are compared to determine whether they fall into the same time window. The size of the time window can be pre-determined. The offset can be factored into the calculation to further enhance accuracy. As described above, the wireless network establishment is similar to the toasting-like ritual, and all involved users naturally push the keys at substantially the same time, and a corresponding activation reference time is recorded in the respective device. If the activation reference times are not in the same time window (No in step S608), the authentication of wireless network between the device 300 and the search device is not established, and the procedure goes to step S612. If the activation reference times are in the same time window (Yes in step S608), in step S609, the authentication of wireless network between the device 300 and the located device is automatically established.

Then, in step S610, at least one wireless operation, such as data exchange or synchronization is performed between the device 300 and the located device. If the wireless operation is not completed (No in step S611), the procedure remain at step S611 to determine whether the wireless operation is completed. If the wireless operation is completed (Yes in step S611), in step S612, the wireless connection between the device 300 and the located device is terminated. In step S613, the wireless connection module 320 is turned off if the original state was off. It is understood that if the wireless operation of each located device on the network corresponding to the same wireless network capability is completed, the wireless connection module 320 is returned to the respective original state.

Similarly, a pop-up interface can be further provided for confirmation the execution of the wireless operation, and determine the types of the wireless operations requested by the device 300 and the located device. If the types are different, the wireless network is terminated.

Methods and devices that automatically and accurately establish wireless network between devices without complex and time-consuming operations are thus provided.

Methods and system, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. Embodiments of the method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the embodiments. When implemented on a general-purpose processor, the program code combines with the processor to provide a unique apparatus that operates analogously to application specific logic circuits.

Although the invention has been described in terms of preferred embodiment, it is not intended to limit the invention to the precise embodiments disclosed herein. Those who are skilled in this technology can make various alterations and modifications without departing from the scope and spirit of this invention. Therefore, the scope of the present invention shall be defined and protected by the following claims and their equivalents.

What is claimed is:

1. A method for establishing wireless network communication between devices, comprising:
   recording a first activation reference time when a first device is activated to establish a wireless network with other devices;
   searching for and identifying at least one second device on a network corresponding to at least one wireless network capability;
   receiving a second activation reference time of the second device, wherein the second activation reference time is generated when the second device is activated to establish wireless network with other devices;
   comparing the first activation reference time and the second activation reference time to determine whether they fall into the same time window; and
   establishing a wireless network between the first and second devices if the first and second activation reference times are in the same time window.

2. The method of claim 1 further comprising calculating an offset between the system times of the first and second devices, wherein the offset is factored into a calculation to further enhance the accuracy of the comparison of the first and second activation reference times.

3. The method of claim 1 further comprising performing at least one wireless operation between the first and second devices.

4. The method of claim 3 wherein the wireless operation comprises a data exchange or synchronization between the first and second devices.

5. The method of claim 3 further comprising determining the types of the wireless operations corresponding to the first and second devices, and terminating the wireless network between the first and second devices if the types are different.

6. A method for establishing wireless network communication between devices, comprising:
   generating an activation signal when a first device is activated to establish a wireless network with other devices;
   checking whether a wireless connection module providing at least one wireless network capability is on in response to the activation signal, and turning on the wireless connection module if it is off;
   searching for and identifying at least one second device on a network corresponding to the wireless network capability; and
   automatically establishing a wireless network between the first and second devices.

7. The method of claim 6 further comprising performing at least one wireless operation between the first and second devices after the wireless network is established.

8. The method of claim 7 further comprising turning off the wireless connection module if the wireless operation is completed.

9. The method of claim 7 further comprising terminating the wireless network between the first and second devices if the wireless operation is completed.

10. The method of claim 6 further comprising recording a first activation reference time when the first device is activated to establish wireless network with other devices.

11. The method of claim 10 further comprising:
comparing the first activation reference time and a second activation reference time of the second device to determine whether they fall into the same time window, wherein the second activation reference time is generated when the second device is activated to establish wireless network with other devices; and
establishing the wireless network between the first and second devices if the first and second activation reference times are in the same time window.

12. The method of claim 11 further comprising calculating an offset between the system times of the first and second devices, wherein the offset is factored into a calculation to further enhance the accuracy of the comparison of the first and second activation reference times.

13. A device for establishing wireless network communication between devices, comprising:
an activation key generating a first activation reference time when the device is activated to establish a wireless network with other devices;
at least one wireless connection module to search for and identify at least one target device on a network corresponding to at least one wireless network capability; and
a processing unit to receive a target activation reference time of the target device, wherein the target activation reference time is generated when the target device is activated to establish wireless network with other devices, compare the first activation reference time and the target activation reference time to determine whether they fall into the same time window, and establish a wireless network to the target devices if the first and target activation reference times are in the same time window.

14. The device of claim 13 wherein the processing unit further calculates an offset between the system times of the devices, wherein the offset is factored into a calculation to further enhance the accuracy of the comparison of the first and target activation reference times.

15. The device of claim 13 wherein the processing unit further performs at least one wireless operation between the devices.

16. The device of claim 15 wherein the wireless operation comprises data exchange or synchronization between the devices.

17. The device of claim 15 wherein the processing unit further determines the types of the wireless operations corresponding to the respective devices, and terminates the wireless network if the types are different.

18. A device for establishing wireless network communication between devices, comprising:
an activation key generating an activation signal when the device is activated to establish a wireless network with other devices;
a wireless connection module providing at least one wireless network capability; and
a processing unit to check whether the wireless connection module is on in response to the activation signal, turn on the wireless connection module if it is off, search for and identify at least one target device on a network corresponding to the wireless network capability, and automatically establish a wireless network to the target device.

19. The device of claim 18 wherein the processing unit further performs at least one wireless operation between the devices after the wireless network is established.

20. The device of claim 19 wherein the processing unit further turns off the wireless connection module if the wireless operation is completed.

21. The device of claim 19 wherein the processing unit further terminates the wireless network if the wireless operation is completed.

22. The device of claim 18 wherein the processing unit further records a first activation reference time when the device is activated to establish wireless network with other devices.

23. The device of claim 22 wherein the processing unit further compares the first activation reference time and a target activation reference time of the target device to determine whether they fall into the same time window, wherein the target activation reference time is generated when the target device is activated to establish wireless network with other devices, and establishes the wireless network to the target devices if the first and target activation reference times are in the same time window.

24. The device of claim 23 wherein the processing unit further calculates an offset between the system times of the devices, wherein the offset is factored into a calculation to further enhance the accuracy of the comparison of the first and target activation reference times.

25. A method for establishing wireless network communication between devices, comprising:
recording a first activation reference time when a first device is activated to establish a wireless network with other devices;
searching for and identifying at least one second device on a network corresponding to at least one wireless network capability;
receiving a second activation reference time of the second device, wherein the second activation reference time is generated when the second device is activated to establish wireless network with other devices;
comparing the first activation reference time and the second activation reference time to determine whether they fall into the same time window;
establishing a wireless network between the first and second devices if the first and second activation reference times are in the same time window; and
performing digital business card exchange between the first and second devices wirelessly.

26. The method of claim 25 further comprising calculating an offset between the system times of the first and second devices, wherein the offset is factored into a calculation to further enhance the accuracy of the comparison of the first and second activation reference times.

* * * * *